Aug. 29, 1939. W. J. HOOPER Re. 21,187

DENTAL CLEANING SPRAY

Original Filed Jan. 27, 1936

INVENTOR
W. J. HOOPER
BY J. S. Cole
ATTORNEY

Reissued Aug. 29, 1939 Re. 21,187

UNITED STATES PATENT OFFICE 21,187

DENTAL CLEANING SPRAY

William J. Hooper, Elsah, Ill., assignor of one-half to Harold A. Hooper, Chicago, Ill.

Original No. 2,094,888, dated October 5, 1937, Serial No. 60,945, January 27, 1936. Application for reissue October 27, 1937, Serial No. 171,392

1 Claim. (Cl. 128—229)

The object of my invention is to provide means to permit the application to the teeth and gums of a relatively fine stream or jet of water under pressure, adapted to clean the teeth and to dislodge particles from the interspaces between the teeth, as well as micro-organisms that may collect at or adjacent to the teeth.

My invention comprises a simple and highly efficient structure, easy to manipulate, and with few parts compactly arranged. My invention also comprises the utilization of a removable nozzle, so that my device may be used by different persons merely by replacing the nozzle. In this way each person using my spray may have his own nozzle which, when fitted to the handle portion, permits the employment of the device without fear of contracting any contagious mouth infections.

The foregoing and other objects are accomplished by my device, which is fully described in the following specification and shown in the accompanying drawing, in which—

Figure 1:
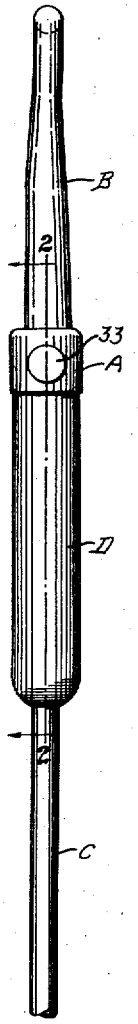
Fig. 1 is a top plan view of my dental cleaning spray.
Figure 2:
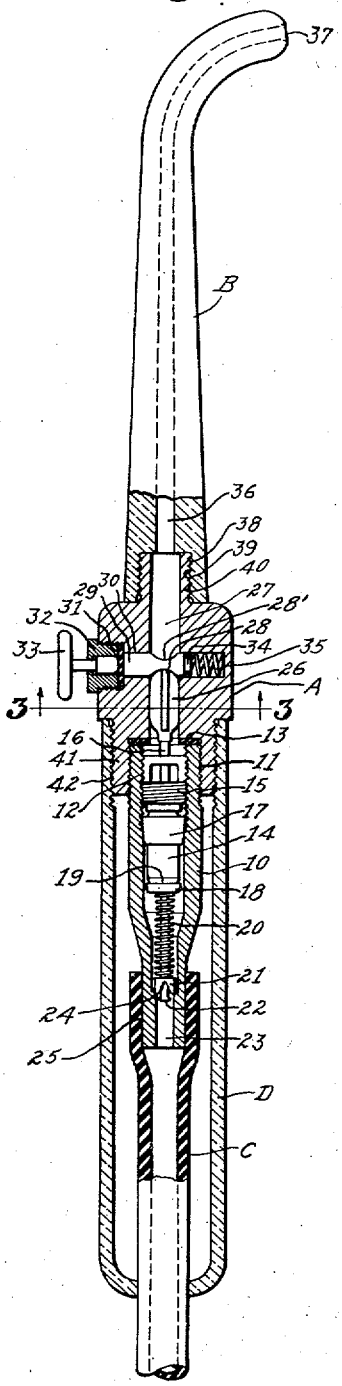
Fig. 2 is an enlarged, partial longitudinal section of the same taken on line 2—2 of Fig. 1, looking in the direction of the arrows.
Figure 3:
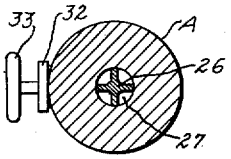
Fig. 3 is a cross-sectional view taken on the line 3—3 of Fig. 2, looking in the direction of the arrows.

The dental cleaning spray as illustrated comprises a body A, a nozzle B, and a rubber tube or pipe C. D is a tubular handle member whereby the spray may be easily manipulated and within which the valve for controlling the flow of water through the spray is located.

10 is a valve chamber of tubular construction inwardly and outwardly screw-threaded, as at 11 and 12, at its inner end. The threads 11 permit it to be screwed into one end of the body A and to seat against a rubber gasket 13.

Screwed into the interior of the tubular member 10 and engaging the screw-threads 12 is a valve-supporting mechanism 14 comprising the screw-threaded member 15, longitudinally through which a relatively long valve stem 16 passes. Immediately adjacent one end of the member 14 and surrounding the stem 16 is a tubular rubber member 17 adapted to prevent the passage of any water through the member 10 outside of the channel for that purpose in the valve-supporting mechanism 14.

18 is a valve secured to the valve stem 16 and adapted to seat on a valve seat 19 on the valve-supporting mechanism 14. Surrounding the end of the valve stem 16 is a coil spring 20 adapted to press at one end against one side of the valve 18 and secured at its other end by a slidable support 21 on the valve stem 16, and prevented from becoming disengaged from said stem by the head 22 formed on the end of the valve stem 16. The longitudinal channel 23 through the valve chamber 10 is contracted as shown at 24 to provide a seat for the support 21. To one end of the valve chamber 10 the water rubber tube D is attached, as shown at 25.

The inner end of the valve stem 16 contacts with a spider 26 which is slidable in the channel 27 extending longitudinally through the body A. The inner end of the spider 26 is rounded as at 28 to fit into an annular depression 28′ in a plunger or cam member 29 slidable in a transverse channel 30 in the body A. The channel 30 bisects the channel 27 also in the body A. The upper end of the cam member 29 contacts a circular rubber dam 31 which prevents the leakage of any water out of the upper end of the channel 30. 32 is a metal plug for holding the dam 31 in place and also to serve as a mounting for a push button 33, the downward end of which contacts the dam 31 and therethrough the upper end of the plunger or cam member 29 to operate the same. The plug 32 is screw-threaded into the outer, enlarged end of the channel 30.

The lower end of the cam member 29 terminates in a reduced portion 34, which is surrounded by one end of a coil spring 35. The other end of said spring 35 rests against the inner end wall of the channel 30, which does not completely pass transversely through the body A.

36 is channel passing longitudinally through the nozzle B and which provides a continuation of the longitudinal channels 23 and 27 in the tube C and body A, so that the water passing therethrough may be discharged through the end 37 of the nozzle B.

It will be noted that the nozzle B is interiorly screw-threaded as at 38 to fit over screw-threads 39 exterior of the projection 40 on the body A. The opposite projecting end 41 on the body A is also exteriorly screw-threaded as at 42 to permit the inner end of the handle D to screw-threadedly engage the projection 41.

All of the parts of my detal cleaning spray are compact, and while all of the parts fit snugly they are not difficult of access and replacement when any needed repairs are required.

When my dental cleaning spray is to be used, the pipe or tube C is attached to the water faucet (not shown), and the water turned on. The water is under a pressure of approximately sixty pounds. The water passes through the tube C into the channel 23 in the member 10 and is checked by the valve 18 in said member 10. The end 37 of the nozzle B is then placed in the mouth in contact with the teeth, and the push button 33 is pressed downwardly to also move downwardly the cam member 29. This movement causes the rounded end 28 of the spider 26 to ride outwardly on the cam face 28' and thereby press against the inner end of the stem 16, which movement causes the valve 18 carried by said stem 16 to unseat and allow the water in the channel 23 of the valve chamber 10 to pass therethrough and into and through the channels 27 and 36 in the body A and nozzle B, respectively. While the push button 33 is held depressed, the flow of water through the channel 36 and the end 37 of the nozzle B continues at a rather high pressure, which causes a fine stream of water to pass into the mouth and between the teeth, thus removing any matter lodged on or between said teeth or on the gums in a way that is not in any wise injurious to the teeth, gums, or other portions of the mouth. When the teeth have been sufficiently cleaned, pressure on the push button 33 is released and the spring 35 raises the cam member 29 into the position shown in Fig. 1. The spring 20 simultaneously presses the valve 18 onto the valve seat 19, assisted by the water pressure. Thus the flow of water through my device is shut off.

If another person desires to use the dental spray, the nozzle B is unscrewed and another one takes its place, and the operation above described is repeated with the new nozzle.

Having thus described my invention, I claim:

A dental cleaning spray comprising a tubular handle portion, a fluid discharge nozzle, a tubular body member interposed between said handle and said nozzle, a valve structure mounted in said body member, said valve structure comprising a tubular valve chamber provided with a valve seat and inner and outer screw-threaded portions whereby said tubular valve chamber may be attached by said outer screw-threaded portion to said tubular body member and a valve member adapted to be threaded into said tubular valve chamber, said valve member being provided with a projecting portion adapted to operate said valve member, means normally retaining said valve member in closed position against said valve seat, means for opening said valve member, said means comprising a push-button, a cam member associated with said push-button and adapted to longitudinally move said projecting portion on said valve member for displacing said valve member from its seat, thereby permitting passage of fluid through said dental cleaning spray, and means for restoring said valve member and push-button to normal position.

WILLIAM J. HOOPER.